(12) United States Patent
Miyajima et al.

(10) Patent No.: US 11,198,413 B2
(45) Date of Patent: Dec. 14, 2021

(54) VEHICLE SEAT BELT APPARATUS

(71) Applicants: MAZDA MOTOR CORPORATION, Hiroshima (JP); MITSUBA CORPORATION, Gunma (JP); ASHIMORI INDUSTRY CO., LTD., Osaka (JP)

(72) Inventors: Yoichi Miyajima, Aki-gun (JP); Shigeru Sugimoto, Higashihiroshima (JP); Tsuyoshi Maruyama, Kiryu (JP); Yohei Inagaki, Kiryu (JP); Yoshio Shimazaki, Settsu (JP); Takayoshi Ijiri, Settsu (JP)

(73) Assignees: MAZDA MOTOR CORPORATION, Hiroshima (JP); ASHIMORI INDUSTRY CO., LTD., Osaka (JP)

( * ) Notice: Subject to any disclaimer, the term of this patent is extended or adjusted under 35 U.S.C. 154(b) by 167 days.

(21) Appl. No.: 16/576,500

(22) Filed: Sep. 19, 2019

(65) Prior Publication Data

US 2020/0101935 A1 Apr. 2, 2020

(30) Foreign Application Priority Data

Sep. 28, 2018 (JP) .............................. JP2018-184217

(51) Int. Cl.
*B60R 22/46* (2006.01)
*B60R 22/36* (2006.01)
*B60R 22/48* (2006.01)

(52) U.S. Cl.
CPC .............. *B60R 22/46* (2013.01); *B60R 22/36* (2013.01); *B60R 22/48* (2013.01); *B60R 2022/4685* (2013.01)

(58) Field of Classification Search
CPC ......... B60R 22/36; B60R 22/46; B60R 22/44; B60R 22/26; B60R 22/48; B60R 22/343
See application file for complete search history.

(56) References Cited

U.S. PATENT DOCUMENTS

2001/0045483 A1 11/2001 Tanaka et al.
2002/0024211 A1 2/2002 Yano et al.
(Continued)

FOREIGN PATENT DOCUMENTS

| EP | 1 498 326 A1 | 1/2005 |
|---|---|---|
| EP | 1 516 789 A2 | 3/2005 |
| JP | 2001-270423 A | 10/2001 |

OTHER PUBLICATIONS

The extended European search report issued by the European Patent Office dated Nov. 21, 2019, which corresponds to European Patent No. 19197980.6-1132 and is related to U.S. Appl. No. 16/576,500.

*Primary Examiner* — Sang K Kim
(74) *Attorney, Agent, or Firm* — Studebaker & Brackett PC

(57) ABSTRACT

A retractor of a seat belt apparatus includes a spool that is configured to wind the seat belt while allowing the seat belt to be pulled out, a motor that includes a shaft coupled to the spool and generates a rotational resistance force against the spool rotating in a direction to pull out the seat belt, the rotational resistance force corresponding to the rotation of the spool and the shaft caused by pulling out of the seat belt, a rotational resistance member that is coupled to the spool and generates a rotational resistance force against the spool rotating in the direction to pull out the seat belt when the seat belt is pulled out in the event of vehicle collision, and a reducing mechanism that reduces the rotation of the spool and transmits a reduced rotation to the shaft.

4 Claims, 5 Drawing Sheets

(56) References Cited

U.S. PATENT DOCUMENTS

| | | |
|---|---|---|
| 2004/0069891 A1 | 4/2004 | Tanaka et al. |
| 2004/0099759 A1 | 5/2004 | Tanaka et al. |
| 2004/0155136 A1 | 8/2004 | Yano et al. |
| 2005/0011983 A1 | 1/2005 | Inuzuka et al. |
| 2005/0029382 A1* | 2/2005 | Inuzuka .................. B60R 22/46 |
| | | 242/390.9 |
| 2005/0061904 A1 | 3/2005 | Inuzuka et al. |
| 2007/0194565 A1* | 8/2007 | Clute ...................... B60R 22/19 |
| | | 280/806 |
| 2017/0327078 A1* | 11/2017 | Son ......................... B60R 22/46 |

* cited by examiner

FRONT SIDE OF VEHICLE ← → REAR SIDE OF VEHICLE

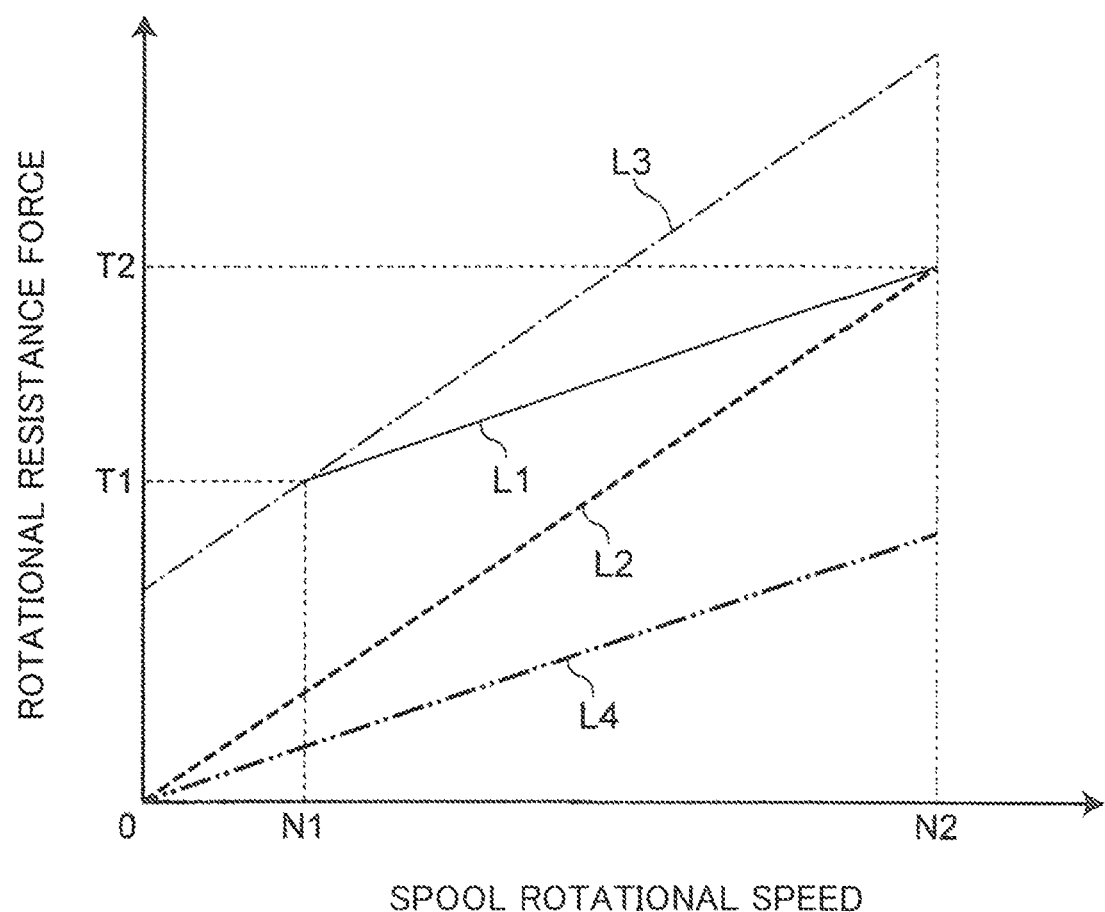

VEHICLE SEAT BELT APPARATUS

TECHNICAL FIELD

The present invention relates to a vehicle seat belt apparatus.

BACKGROUND ART

As a type of seat belt apparatus implemented in vehicles, a three-point seat belt apparatus, which protects a passenger by restraining the upper body and the waist of the passenger sitting in a seat is widely known. The three-point seat belt apparatus includes a retractor fixed to a vehicle body, a seat belt that is pulled out from and wound into the retractor, a belt anchor for fixing an end of the seat belt at the outer side, regarding the vehicle width direction, of the seat, a tongue plate slidably attached to a middle section of the seat belt, and a buckle that detachably holds the tongue plate at the inner side, regarding the width direction of the vehicle, of the seat.

A known retractor of the seat belt apparatus includes a pretensioner mechanism and a load-limiter mechanism. The pretensioner mechanism retracts the seat belt to reduce a slack of the seat belt to restrain a passenger in the event of vehicle collision. The load-limiter mechanism loosen the seat belt when a load higher than a predetermined level acts on the seat belt in the event of vehicle collision to limit the load that acts on the passenger.

A known load-limiter mechanism uses a torsion bar coupled to a spool that winds the seat belt while allowing the seat belt to be pulled out. In the event of vehicle collision, the pretensioner mechanism retracts the seat belt and if a load higher than a predetermined level acts on the seat belt, the torsion bar is twisted to loosen the seat belt.

In the load-limiter mechanism including the torsion bar, the torsion bar is twisted by the seat belt receiving a load of a predetermined level or higher, so that the load with which the seat belt restrains the passenger is determined by a profile of the torsion bar and is always constant.

In contrast, for example, JP 2001-270423 A discloses a seat belt apparatus including a short-circuited direct-current motor coupled to a spool that winds the seat belt while allowing the seat belt to be pulled out. In the event of vehicle collision, a rotational resistance force of the motor restricts the pull-out of the seat belt and thereby the load with which the belt restrains the passenger is adjusted.

For example, when the collision velocity is high or the passenger has a large body frame, the pull-out speed of the seat belt is higher than when the collision velocity is small or the passenger has a small body frame, and thus the rotational speed of the motor is higher. This increases the rotational resistance force of the motor to increase the load restraining the passenger. With the direct-current motor coupled to the spool, the load with which the seat belt restrains the passenger can be adjusted to the body frame of the passenger and the collision velocity.

The inventors have made an effort to arrive at an idea that, in order to function a seat belt to properly restrain a passenger jerked toward the front side of a vehicle in the event of vehicle collision happening under various conditions of different passenger body frames and different collision velocities, a rotational resistance force acting on a spool is preferably generated to take a value determined by an ideal rotational resistance force profile indicated by a solid line L1 in FIG. 5.

The ideal rotational resistance force profile L1 is set so as the rotational resistance force to become larger as a spool rotational speed increases. Specifically, the ideal rotational resistance force profile L1 is set so as the rotational resistance force to take a first predetermined value T1 when the spool rotational speed is a first rotational speed N1 and take a second predetermined value T2 larger than the first predetermined value T1 when the spool rotational speed is a second rotational speed N2 larger than the first rotational speed N1. Setting the rotational resistance force to take the first predetermined value T1 when the spool rotational speed is the first rotational speed N1 properly restrains the passenger in the seat in the event of vehicle collision when the collision velocity is low or when the passenger has a small body frame. Setting the rotational resistance force to take the second predetermined value T2 when the spool rotational speed is the second rotational speed N2 properly restrains the passenger in the seat in the event of vehicle collision when the collision velocity is high or when the passenger has a large body frame.

However, it is difficult to realize the rotational resistance force to take the value determined by the ideal rotational resistance force profile L1 using a conventional mechanism.

For example, when a short circuited direct-current motor is directly coupled to the spool, the rotational resistance force that acts on the spool is generated to take a value determined by a linear profile passing the point of origin (a broken line L2 in FIG. 5). In this case, a motor that generates the rotational resistance force which takes a value of the second predetermined value T2 when the spool rotational speed is the second rotational speed N2 may be used as the direct-current motor. Unfortunately, using such a motor, the rotational resistance force takes a value smaller than the first predetermined value T1 when the spool rotational speed is the first rotational speed N1.

To solve this problem, a torsion bar that is twisted by a load larger than a predetermined load may additionally be used. For example, a torsion bar may additionally be used so as a total rotational resistance force, which is the sum of the rotational resistance force of the torsion bar and the rotational resistance force of the motor, to take the first predetermined value T1 when the spool rotational speed is the first rotational speed N1. Unfortunately, using such a torsion bar, the rotational resistance force becomes larger than the second predetermined value T2 when the spool rotational speed is the second rotational speed N2 as indicated by a dot-and-dash line L3 in FIG. 5.

SUMMARY OF INVENTION

An object of the present invention is to provide a vehicle seat belt apparatus that properly restrains a passenger in the event of vehicle collision happening under various conditions of different passenger body frame sizes and different collision velocities to improve passenger safety.

To solve the problem described above, an embodiment of the present invention is a vehicle seat belt apparatus including a retractor and a seat belt configured to restrain a passenger sitting in a seat in the event of vehicle collision. The retractor includes a spool that is rotatable and configured to wind the seat belt while allowing the seat belt to be pulled out, a motor that includes a shaft coupled to the spool and is configured to generate a rotational resistance force against the spool rotating in a direction to pull out the seat belt, the rotational resistance force corresponding to the rotation of the spool and the shaft caused by pulling out of the seat belt, a rotational resistance member coupled to the spool and configured to generate a rotational resistance force against the spool rotating in the direction to pull out the seat belt when the seat belt is pulled out in the event of vehicle collision, and a reducing mechanism configured to reduce the rotation of the spool and transmit a reduced rotation to the shaft.

BRIEF DESCRIPTION OF DRAWINGS

FIG. 5 is a chart illustrating the relationship between a spool rotational speed and a rotational resistance force of the seat belt apparatus.

DESCRIPTION OF EMBODIMENTS

An embodiment of the present invention will be described with reference to the attached drawings.

Figure 1:
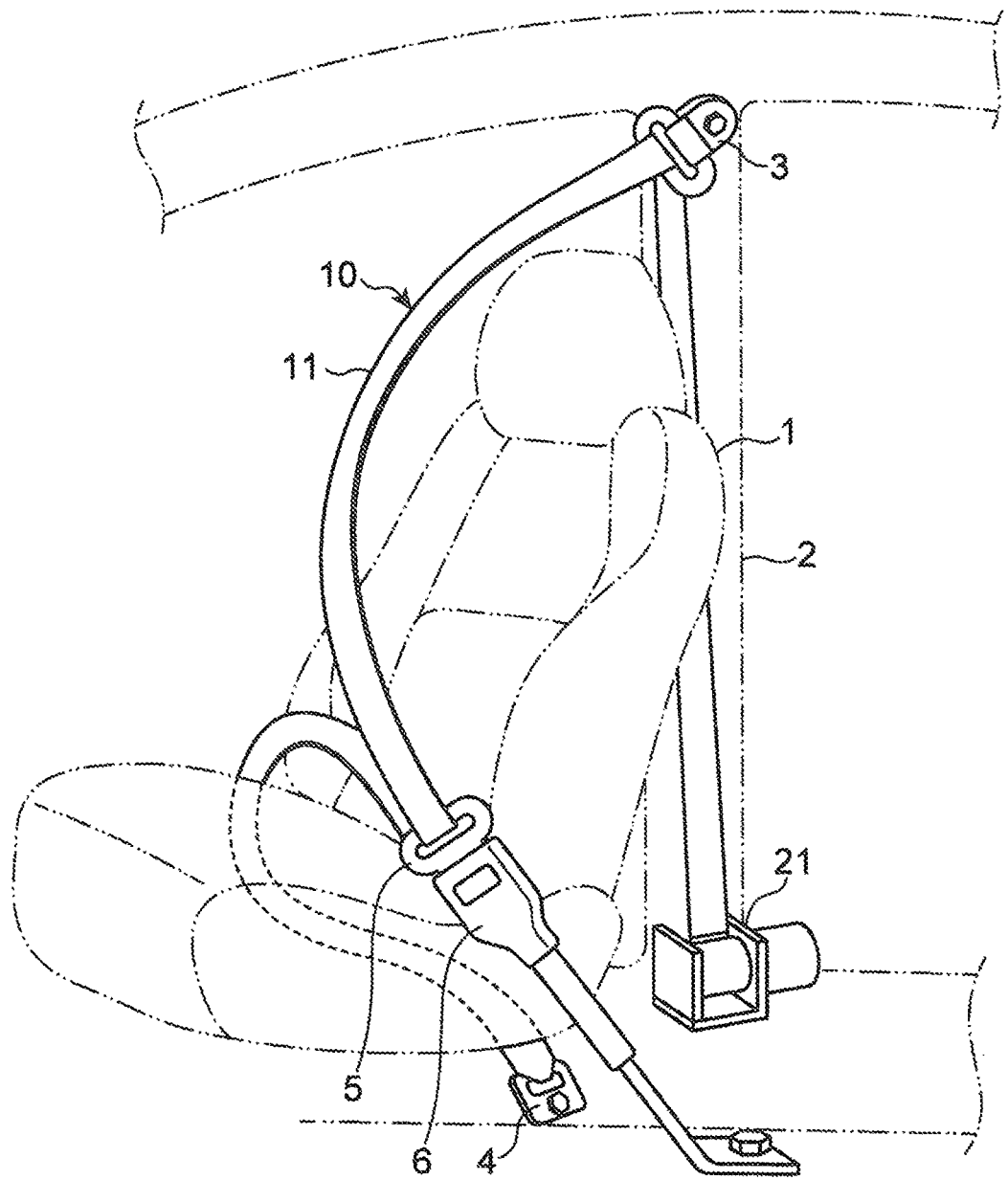
FIG. 1 is a perspective view schematically illustrating a seat belt apparatus according to an embodiment of the present invention.

FIG. 1 is a schematic perspective view of a seat belt apparatus 10 according to an embodiment of the present invention. The seat belt apparatus 10 is implemented in a vehicle to protect, by restraining, a passenger sitting in a front seat 1 (hereinafter simply referred to as a seat 1) in a vehicle interior. The seat belt apparatus 10 is a three-point seat belt apparatus, which restrains the upper body and the waist of the passenger sitting in the seat 1.

The seat belt apparatus 10 includes a seat belt 11, a retractor 21, an upper belt anchor 3, a lower belt anchor 4, a tongue plate 5, and a buckle 6.

The seat belt 11 is a flexible belt used for restraining the passenger sitting in the seat 1.

The retractor 21 is configured to wind the seat belt 11 while allowing the seat belt 11 to be pulled out and is fixed to the bottom end of a center pillar 2.

The upper belt anchor 3 is fixed to the top end of the center pillar 2. The seat belt 11 pulled out upward from the retractor 21 runs through the upper belt anchor 3.

The lower belt anchor 4 is fixed to a bottom portion of the vehicle body at the outer side, regarding the vehicle width direction, of the seat 1. An end of the seat belt 11 is fixed to the lower belt anchor 4.

The tongue plate 5 is attached to the seat belt 11 so as to slide between the upper belt anchor 3 and the lower belt anchor 4.

The buckle 6 is disposed at the inner side, regarding the vehicle width direction, of the seat 1 to detachably hold the tongue plate 5 attached to the seat belt 11.

In other words, the seat belt 11 runs from the retractor 21, through the upper belt anchor 3 and the buckle 6, and to the lower belt anchor 4. The seat belt 11 restrains the upper body and the waist of the passenger sitting in the seat 1 with the tongue plate 5 engaged with the buckle 6.

Figure 2:
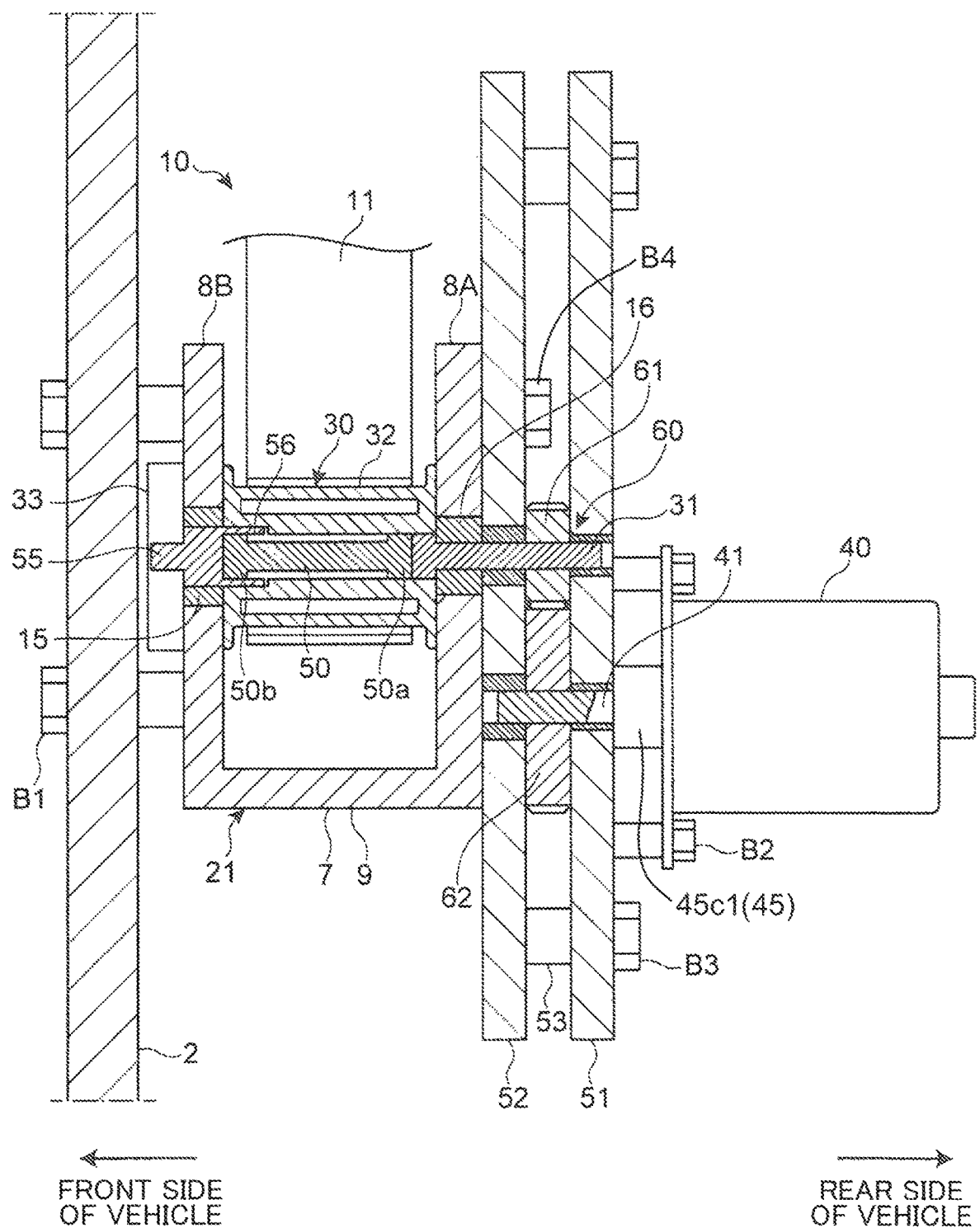
FIG. 2 is a cross-sectional view illustrating a retractor of the seat belt apparatus.

FIG. 2 is a cross-sectional view illustrating the internal structure of the retractor 21. As illustrated in FIG. 2, the retractor 21 includes a spool 30 that winds the seat belt 11 while allowing the seat belt 11 to be pulled out, a motor 40 coupled to the spool 30, and a reducing mechanism 60 provided between the motor 40 and the spool 30.

The spool 30 includes a spool rotor shaft 31 and a cylinder 32. The cylinder 32 is an approximately cylindrical member around which the seat belt 11 is tightly wound. The spool rotor shaft 31 is fixed to one of axial ends of the cylinder 32 (the end further to the rear side of the vehicle). The spool rotor shaft 31 is disposed coaxial with the cylinder 32 and extends along the front-and-rear direction of the vehicle. The spool rotor shaft 31 is rotatably supported by a housing 7 fixed to the center pillar 2.

A torsion bar 50 is coupled to the spool 30. The torsion bar 50 is disposed inside the cylinder 32 in a posture coaxial with the spool 30. The torsion bar 50 functions as a rotational resistance member that generates a rotational resistance force against the spool 30 rotating by the seat belt 11 being pulled out.

The torsion bar 50 has a form of a bar and generates a rotational resistance force by twisting. The torsion bar 50 includes a first end 50a fixed to the spool 30, and a second end 50b not fixed to the spool 30. The first end 50a is fixed to an end, further to the rear side of the vehicle, of the cylinder 32 of the spool 30. The second end 50b is rotatably supported by the housing 7 via a lock base member 55 at an end, further to the front side of the vehicle, of the cylinder 32.

The lock base member 55 has a form of a column with a recess 56 in one of axial ends (the end further to the rear side of the vehicle). The recess 56 fits on the second end 50b of the torsion bar 50 to couple together the lock base member 55 and the torsion bar 50. The lock base member 55 is rotatably supported by the housing 7 and can rotate relative to the spool 30 (cylinder 32).

The housing 7 includes a pair of side plates 8A and 8B that are parallel to and oppose each other along the front-and-rear direction, and a connection part 9 interconnecting the bottom ends of the side plates 8A and 8B. The housing 7 has an approximately U-shaped cross section. The side plate 8B further to the front side of the vehicle rotatably supports the lock base member 55 via a bearing 15, and the side plate 8A further to the rear side of the vehicle rotatably supports the spool rotor shaft 31 via a bearing 16. The connection part 9 is disposed below the cylinder 32 with a gap therebetween. The side plate 8B further to the front side of the vehicle is fixed to the center pillar 2 by fasteners B1, and thereby the housing 7 is fixed to the vehicle body. In other words, the spool 30 is rotatably supported by the vehicle body via the housing 7.

Although not illustrated in the drawings, the spool 30 includes a spring unit that urges the spool 30 in a direction to wind the seat belt 11. The spring unit includes a spiral spring coupled to the spool rotor shaft 31 or the cylinder 32. The spiral spring urges the spool 30 in the direction to wind the seat belt 11.

The spool 30 includes a lock mechanism 33 provided between the center pillar 2 and the housing 7 to restrict pulling out of the seat belt 11. A known mechanism can be used as the lock mechanism 33. The lock mechanism 33 is detachably coupled to the lock base member 55 coupled to the spool 30 via the torsion bar 50. The lock mechanism 33 operates in the event of vehicle collision to restrict the lock base member 55 from rotating in the direction to pull out the seat belt 11. The rotation of the spool 30 (pulling out of the seat belt 11) is thereby restricted.

Although not illustrated in the drawings, the vehicle according to the embodiment in which the seat belt apparatus 10 is implemented is provided with a collision detector like an acceleration sensor that detects collision of the vehicle, such as a head-on collision, and a controlling unit that controls, for example, the lock mechanism 33 according to a signal given by the collision detector. For example, when the collision detector detects collision of the vehicle, the controlling unit operates the lock mechanism 33 to restrict pulling out of the seat belt 11.

As illustrated in FIG. 2, the motor 40 is attached to the housing 7 via a first plate 51 and a second plate 52. The first plate 51 and the second plate 52 are parallel to each other, and the second plate 52 is attached to the side plate 8A, further to the rear side of the vehicle, of the housing 7.

The motor 40 is attached to the first plate 51 by fasteners B2. The first plate 51 is attached to the second plate 52 via sleeves 53 by fasteners B3. The second plate 52 is attached to the side plate 8A of the housing 7 by fasteners B4.

The reducing mechanism 60 reduces the rotation of the spool 30 and transmits the reduced rotation to a motor rotor shaft 41 (corresponding to a shaft in the present invention). Specifically, the reducing mechanism 60 includes a spool gear 61 fixed to the spool rotor shaft 31, and a motor gear 62 meshing with the spool gear 61 and fixed to the motor rotor shaft 41. The motor gear 62 has an outer diameter larger than the outer diameter of the spool gear 61. The rotation of the spool 30 is reduced by the difference of the outer diameters and transmitted to the motor rotor shaft 41. The reduction ratio of the reducing mechanism 60, that is, the reduction ratio determined by the difference in outer diameter between the gears 61 and 62, is set so as the rotational speed of the motor rotor shaft 41 not to exceed the maximum allowable rotational speed of the motor 40 when the seat belt 11 is pulled out.

Figure 3:
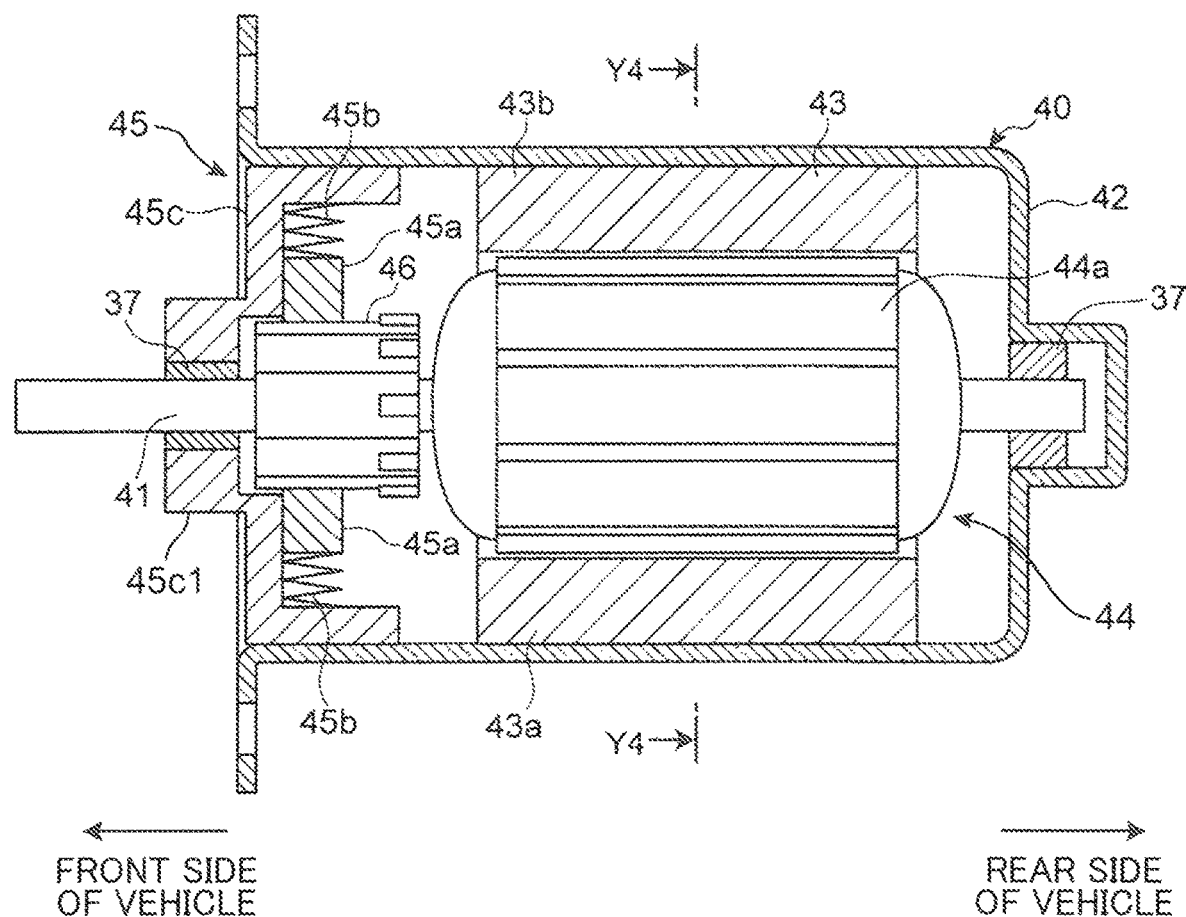
FIG. 3 is a cross-sectional view illustrating a motor included in the retractor.
Figure 4:
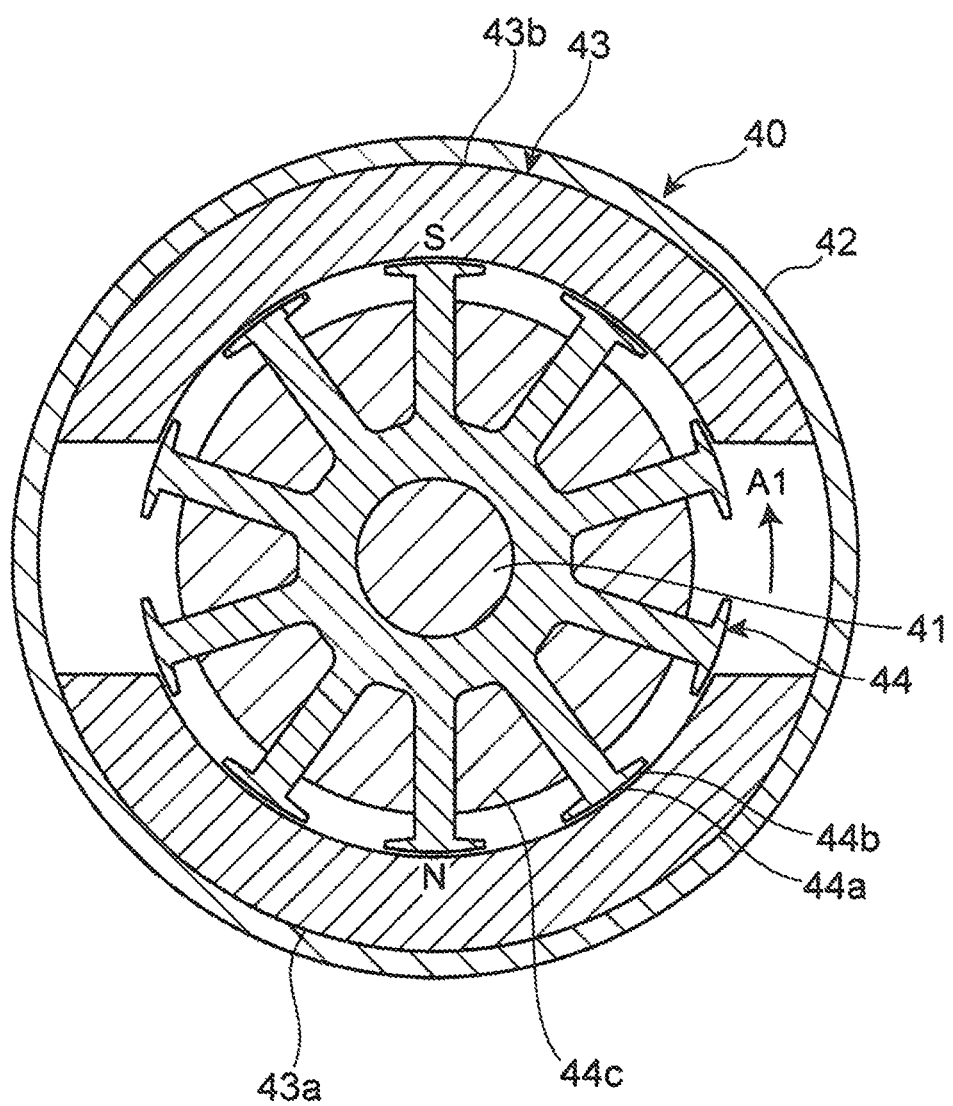
FIG. 4 is a cross-sectional view of the motor taken along a line Y4-Y4 in FIG. 3.

FIG. 3 is a cross-sectional view illustrating the internal structure of the motor 40. FIG. 4 is a cross-sectional view taken along a line Y4-Y4 in FIG. 3. As illustrated in FIGS. 3 and 4, the motor 40 is a direct-current motor including a brush and includes the motor rotor shaft 41 coupled to the spool 30 via the reducing mechanism 60, a housing 42, a permanent magnet 43, an armature 44, a brush unit 45, and a commutator 46. When the seat belt 11 is pulled out, the motor 40 generates a rotational resistance force corresponding to the rotation of the motor rotor shaft 41. The detail will be described later.

The housing 42 is made of a magnetic material and functions as a yoke. The housing 42 has a form of a bottomed cylinder with an opened face facing the front side of the vehicle. The permanent magnet 43 has circumferential faces concentric with the housing 42 in a cross-sectional view, and is fixed to the inner circumferential face of the housing 42. The armature 44 is fixed to the motor rotor shaft 41 and rotatably supported in the radially inner side of the permanent magnet 43. The brush unit 45 is mounted on the end portion, further to the front side of the vehicle, of the housing 42 to cover the opening of the housing 42. The commutator 46 is provided between the brush unit 45 and the armature 44.

The armature 44 includes an armature core 44b and a plurality of armature coils 44c (see FIG. 4). The armature core 44b includes a plurality of radially projecting teeth 44a fixed to the motor rotor shaft 41. A plurality of the armature coils 44c are each wound along a slot between the teeth 44a. Each of the armature coils 44c is connected to the commutator 46.

The brush unit 45 includes a pair of brushes 45a, a pair of springs 45b, and a brush holder 45c (see FIG. 3). The brush holder 45c is mounted on the housing 42 with the brushes 45a held inside the brush holder 45c. The springs 45b urges the brushes 45a inward in a radial direction to push the brushes 45a against the commutator 46. The brushes 45a are connected to the armature coils 44c via the commutator 46.

The brush holder 45c includes a protruding portion 45c1 that protrudes further toward the first plate 51 than the end (opening) of the housing 42 facing the front side of the vehicle. The housing 42 is fastened to the first plate 51 with the protruding portion 45c in contact with the first plate 51.

Although not illustrated in the drawings, a terminal connectable to an external power source is attached to each of a pair of the brushes 45a. In the embodiment, the terminals of a pair of the brushes 45a are connected to each other, namely, short-circuited.

The motor rotor shaft 41 is rotatably supported by the brush holder 45c via a bearing 37. The armature 44 can rotate inside the housing 42 integrally with the motor rotor shaft 41. In other words, the motor rotor shaft 41 and the armature 44 are rotatably supported by the brush holder 45c and the housing 42.

As illustrated in FIG. 4, the permanent magnet 43 includes a first permanent magnet 43a and a second permanent magnet 43b both fixed inside the housing 42. The permanent magnets 43a and 43b have the same cross-section of an approximately semi-circle arc. The permanent magnets 43a and 43b are disposed inside the housing 42 to oppose each other. The first permanent magnet 43a has an N-pole in the radially inner side and the second permanent magnet 43b has an S-pole in the radially inner side. In other words, the permanent magnet 43 generates a magnetic flux flowing from the N-pole of the first permanent magnet 43a to the S-pole of the second permanent magnet 43b.

As for the seat belt apparatus 10 configured as described above, in the event of vehicle collision, such as a head-on collision, the seat belt 11 is pulled out of the retractor 21 by a movement of a passenger jerked toward the front side of the vehicle by an inertia force. In this state, the rotational resistance force of the torsion bar 50 and the rotational resistance force of the motor 40 act on the spool 30 to restrict the seat belt 11 from being pulled out, thereby increasing a force to restrain the passenger. This mechanism is explained below.

When the vehicle collides, the collision detector detects the collision, and the controlling unit receiving the detection signal operates the lock mechanism 33 to restrict the rotation of the lock base member 55. Since the lock base member 55 is coupled to the spool 30 via the torsion bar 50, restriction of rotation of the lock base member 55 causes a twist in the torsion bar 50. Since the first end 50a of the torsion bar 50 is fixed to the cylinder 32 of the spool 30 and the second end 50b of the torsion bar 50 is fixed to the lock base member 55, the torsion bar 50 is twisted by an amount corresponding to the amount of the seat belt 11 pulled out (by which the spool 30 rotates) with the rotation of the lock base member 55 restricted by the lock mechanism 33. This twist generates the rotational resistance force against pulling out of the seat belt 11 (or rotation of the spool 30 in the direction to pull out the seat belt 11). Pulling out of the seat belt 11 is thereby restricted.

Besides, in the event of vehicle collision, the rotational resistance force of the motor 40 coupled to the spool 30 via the reducing mechanism 60 also acts on the spool 30. In the event of vehicle collision, the seat belt 11 is pulled out and the spool 30 rotates in such a direction (pull-out direction). The rotation of the spool 30 is transmitted to the motor rotor shaft 41 via the reducing mechanism 60, and the motor rotor shaft 41 is thereby rotated in the direction indicated by an arrow A1. An inverse electromotive force corresponding to the rotation of the motor rotor shaft 41 is generated, thereby generating a force against the rotation of the motor rotor shaft 41, namely, the rotational resistance force. The rotational resistance force of the motor 40 is larger for a higher motor rotational speed. This means the passenger is restrained by a larger load for a higher pull-out speed of the seat belt 11.

The inertia force acting on the passenger in the event of vehicle collision is larger for a passenger with a larger body frame (namely, a heavier weight). When a passenger is jerked toward the front side of the vehicle by the inertia force in the event of collision, a passenger with a large body frame moves at a higher speed than a passenger with a small body frame, which increases the pull-out speed of the seat belt 11 pulled out by the movement of the passenger. Moreover, a larger inertia force acts on the passenger when a vehicle collides at a higher speed. Thus, the pull-out speed of the seat belt 11 under a high collision speed is higher than under a low collision speed. With the explanation given above and with the relationship between the rotational resistance force of the motor 40 and the pull-out speed of the seat belt 11, the rotational resistance force of the motor 40 (in other words, the load restraining the passenger with the seat belt 11) is larger for a larger passenger body frame or a higher vehicle collision speed. In other words, the motor 40 has a function to adjust the load that restrains the passenger with the seat belt 11 depending on the body frame of the passenger and the collision speed.

As described above, the retractor 21 of the seat belt apparatus 10 according to the embodiment can generate both the rotational resistance force of the motor 40 and rotational resistance force of the torsion bar 50 when the seat belt 11 is pulled out by the forward movement of the passenger in the event of vehicle collision. In particular, the retractor 21 of the embodiment is configured to generate the rotational resistance force of the motor 40 and the torsion bar 50 so as to manifest the ideal rotational resistance force profile indicated by the solid line L1 in FIG. 5. This enables generating a proper restraining force given by the seat belt 11 under various conditions of different passenger body frames and different collision speeds.

The ideal rotational resistance force profile L1 is determined so as the rotational resistance force to take a first predetermined value T1 when the spool rotational speed is a first rotational speed N1 and take a second predetermined value T2 (>T1) when the spool rotational speed is a second rotational speed N2 (>N1). The first predetermined value T1 corresponding to the first rotational speed N is determined as a proper rotational resistance force for a vehicle collision when a collision velocity is low or when a passenger has a small body frame. The second predetermined value T2 corresponding to the second rotational speed N2 is determined as a proper rotational resistance force for a vehicle collision when a collision velocity is high or when a passenger has a large body frame.

Specifically, the first rotational speed N1 and the first predetermined value T1 are determined to take such values that properly restrain the passenger in the seat in the event of vehicle collision under conditions (i) and (ii) described below.
  (i) The vehicle collision speed is 15 km/h.
  (ii) The passenger has a body frame of 5 percentile of adult women in The United States. That is, if every woman in The United States is sorted by the body frame size in the ascending order, the passenger is a woman who comes at 5% among all the women when counted from the smallest woman.

The second rotational speed N2 and the second predetermined value T2 are determined to take such values that properly restrain the passenger in the seat in the event of vehicle collision under conditions (iii) and (iv) described below.
  (iii) The vehicle collision speed is 50 km/h.
  (iv) The passenger has a body frame of 95 percentile of adult men in The United States.
That is, if every man in The United States is sorted by the body frame size in the ascending order, the passenger is a man who comes at 95% among all the men when counted from the smallest man.

The values N1, N2, T1, and T2 (or the ideal rotational resistance force profile L1) can be obtained by adjusting the capacity of the motor 40, the reduction ratio of the reducing mechanism 60, and twist characteristics of the torsion bar 50. In the embodiment, the capacity of the motor 40, the reduction ratio of the reducing mechanism 60, and the twist characteristics of the torsion bar 50 are set so as the rotational resistance force to take the first predetermined value T1 when the spool rotational speed is the first rotational speed N1 and take the second predetermined value T2 when the spool rotational speed is the second rotational speed N2.

The reduction ratio of the reducing mechanism 60 is set to satisfy the condition that the motor rotational speed (rotational speed of the motor rotor shaft 41) takes a value below the maximum allowable rotational speed of the motor 40 when the spool rotational speed is the second rotational speed N2. In other words, the reduction ratio of the reducing mechanism 60 is set for the embodiment so as the motor rotational speed not to exceed the maximum allowable rotational speed under almost every expected condition of vehicle collision.

As described above, the retractor 21 of the seat belt apparatus 10 according to the embodiment includes the spool 30 configured to wind the seat belt 11 while allowing the seat belt 11 to be pulled out, the motor 40 that includes the motor rotor shaft 41 coupled to the spool 30 and is configured to generate a rotational resistance force, when the seat belt 11 is pulled out, against the spool 30 rotating in the direction to pull out the seat belt 11, the torsion bar 50 (rotational resistance member) coupled to the spool 30 and configured to generate a rotational resistance force against the spool 30 rotating in the direction to pull out the seat belt 11 in the event of vehicle collision, and the reducing mechanism 60 provided between the spool 30 and the motor rotor shaft 41 and configured to reduce the rotation of the spool 30 and transmit the reduced rotation to the motor rotor shaft 41.

With this configuration, when the seat belt 11 is pulled out by the passenger being jerked toward the front side of the vehicle in the event of vehicle collision, such as a head-on collision, a combination of the motor 40 and the torsion bar 50 gives a proper rotational resistance force to the spool 30. This restricts pulling out of the seat belt 11 to properly restrain the passenger under conditions of different passenger body frames and different collision speeds.

In the event of vehicle collision, for example, when the collision velocity is high or the passenger has a large body frame, the pull-out speed of the seat belt 11 is higher than when the collision velocity is small or the passenger has a small body frame. Meanwhile, the motor 40 generates a larger rotational resistance force for a higher pull-out speed of the seat belt 11. This means that the total resistance force, which is the sum of the rotational resistance force of the motor 40 and the rotational resistance force of the torsion bar 50 (which is constant regardless of the pull-out speed), changes proportional to the pull-out speed of the seat belt 11, in more detail, the total resistance force takes a value determined by a direct function line having a positive intercept value corresponding to the rotational resistance force of the torsion bar 50. This gives a proper rotational resistance force corresponding to the passenger body frame or the collision speed to the spool 30 to properly restrain the passenger with the seat belt 11 in the event of vehicle collision.

In particular, in the embodiment, the reducing mechanism 60 reduces the rotation of the spool 30 and transmits the reduced rotation to the motor rotor shaft 41, thereby avoiding the generated rotational resistance force becoming excessive under a condition of a high spool rotational speed (high pull-out speed of the seat belt 11).

For example, let it assume that the spool 30 and the motor rotor shaft 41 are directly coupled to each other (coupled without providing a reducing mechanism therebetween) and the motor 40 solely manifests the rotational resistance force profile indicated by the broken line L2 in FIG. 5, namely, the rotational resistance force takes the second predetermined value T2 when the spool rotational speed is the second rotational speed N2. If the motor 40 manifesting such a profile is combined with the torsion bar 50, the rotational resistance force of the motor 40 and the torsion bar 50 manifests the profile indicated by the dot-and-dash line L3 in FIG. 5, which shows that the rotational resistance force exceeds a desired value (the second predetermined value T2) when the spool rotational speed is the second rotational speed N2. In contrast, in the embodiment, the rotation of the spool 30 is transmitted to the motor rotor shaft 41 via the reducing mechanism 60, that is, the reducing mechanism 60 reduces the increase in the rotational resistance force corresponding to the increase in the spool rotational speed. Specifically, the reduction ratio of the reducing mechanism 60 can be set so as the rotational resistance force of the motor 40 solely manifests the profile indicated by a phantom line L4 in FIG. 5. In this manner, the total resistance force, which is the sum of the rotational resistance force of the motor 40 and the rotational resistance force of the torsion bar 50, manifests the ideal rotational resistance force profile indicated by the solid line L1 in FIG. 5. Accordingly, the passenger can be restrained by a proper force regardless of the collision force or the passenger body frame. The passenger safety can thus be improved.

Furthermore, in the embodiment, the reduction ratio of the reducing mechanism 60 is set so as the rotational speed of the motor rotor shaft 41 to be not higher than the maximum allowable rotational speed of the motor 40 when the seat belt 11 is pulled out. This avoids using the motor 40 under such a condition that the rotational speed exceeds the maximum allowable rotational speed, so that the durability of the motor 40 can properly be kept. Accordingly, both the durability of the motor 40 and passenger safety in the event of vehicle collision can be achieved.

Furthermore in the embodiment, the torsion bar 50 that generates the rotational resistance force by twisting is used as the rotational resistance member, that is, the rotational resistance force of the motor 40 is supplemented with an additional rotational resistance force by using a relatively simple configuration to properly adjust the force to restrain the passenger in the event of vehicle collision. Thus, the passenger can properly be restrained using a combination of the motor 40 and the torsion bar 50.

Preferable embodiment of the present invention is described above. The present invention is not limited to the illustrated embodiment. Various modifications and alterations in design can be made without departing from the spirit and the scope of the present invention.

An example embodiment in which the present invention is applied to the seat belt apparatus 10 provided to the front seat 1 is described. Likewise, the present invention can be applied to a rear seat disposed further to the rear side of the vehicle than the front seat 1. In this case, a retractor having the same structure as the retractor 21 of the embodiment described above is prepared as the retractor that winds a seat belt for the rear seat, and the retractor may be fixed to the vehicle body, for example, to a rear pillar.

Summary of Embodiment

The embodiment described above may be summarized as below.

The vehicle seat belt apparatus according to the embodiment includes a retractor and a seat belt configured to restrain a passenger sitting in a seat in the event of vehicle collision. The retractor includes a spool that is rotatable and configured to wind the seat belt while allowing the seat belt to be pulled out, a motor that includes a shaft coupled to the spool and is configured to generate a rotational resistance force against the spool rotating in a direction to pull out the seat belt, the rotational resistance force corresponding to the rotation of the spool and the shaft caused by pulling out of the seat belt, a rotational resistance member coupled to the spool and configured to generate a rotational resistance force against the spool rotating in the direction to pull out the seat belt when the seat belt is pulled out in the event of vehicle collision, and a reducing mechanism configured to reduce the rotation of the spool and transmit a reduced rotation to the shaft.

According to the seat belt apparatus, when the seat belt is pulled out by the passenger being jerked toward the front side of the vehicle in the event of vehicle collision, such as a head-on collision, a combination of the motor and the rotational resistance member gives a proper rotational resistance force to the spool. This restricts pulling out of the seat belt to properly restrain the passenger under conditions of different passenger body frames and different collision speeds.

For example, when the collision velocity is high or the passenger has a large body frame, the pull-out speed of the seat belt in the event of vehicle collision is higher than when the collision velocity is small or the passenger has a small body frame. Meanwhile, the motor generates a larger rotational resistance force for a higher pull-out speed of the seat belt. This means that the total resistance force, which is the sum of the rotational resistance force of the motor and the rotational resistance force of the rotational resistance member (which is constant regardless of the pull-out speed), changes proportional to the pull-out speed of the seat belt, in more detail, the total resistance force takes a value determined by a direct function line having a positive intercept value corresponding to the rotational resistance force of the rotational resistance member. This gives a proper rotational resistance force corresponding to the passenger body frame or the collision speed to the spool as indicated, for example, by the ideal rotational resistance force profile L1 in FIG. 5. Thus, the passenger is properly restrained with the seat belt in the event of vehicle collision.

In particular, in the seat belt apparatus described above, the reducing mechanism reduces the rotation of the spool and transmits the reduced rotation to the shaft, thereby avoiding the generated rotational resistance force becoming excessive under a condition of a high spool rotational speed (high pull-out speed of the seat belt). The ratio of the increase in the rotational resistance force to the increase in the spool rotational speed can be adjusted (reduced) by the reducing mechanism so as the total resistance force, which is the sum of the rotational resistance force of the motor and the rotational resistance force of the rotational resistance member, to take a proper value even under a condition of a high spool rotational speed. Regardless of the difference in the collision speed and the passenger body frame, the passenger can be restrained with a proper force to improve passenger safety.

Preferably, in the seat belt apparatus, the reduction ratio of the reducing mechanism is set so as the rotational speed of the shaft to be not higher than the maximum allowable rotational speed of the motor when the seat belt is pulled out.

Such a configuration avoids the motor being used at a rotational speed exceeding the maximum allowable rotational speed, thereby keeping the durability of the motor.

Preferably, in the seat belt apparatus, the rotational resistance member is a torsion bar that is disposed coaxial with the spool and generates the rotational resistance force by twisting.

This configuration, having a relatively simple structure using the rotational resistance force of the torsion bar and the rotational resistance force of the motor, properly restrains a passenger in the event of vehicle collision.

INDUSTRIAL APPLICABILITY

As described above, the vehicle seat belt apparatus according to the embodiment of the present invention can improve passenger safety by properly restraining the passenger in the event of vehicle collision under various conditions of different passenger body frames and different collision speeds. Thus, the seat belt apparatus may be used in a suitable manner in the field of safety technologies.

This application is based on Japanese Patent application No. 2018-184217 filed in Japan Patent Office on Sep. 28, 2018, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A vehicle seat belt apparatus comprising:
a retractor; and
a seat belt configured to restrain a passenger sitting in a seat in the event of vehicle collision;
the retractor including
a spool that is rotatable and configured to wind the seat belt while allowing the seat belt to be pulled out,
a motor that includes a shaft coupled to the spool and is configured to be short-circuited to generate a rotational resistance force against the spool rotating in a direction to pull out the seat belt, the rotational resistance force corresponding to the rotation of the spool and the shaft caused by pulling out of the seat belt,
a rotational resistance member coupled to the spool and configured to generate a rotational resistance force against the spool rotating in the direction to pull out the seat belt when the seat belt is pulled out in the event of vehicle collision, and
a reducing mechanism configured to reduce the rotation of the spool and transmit a reduced rotation to the shaft,
wherein the motor includes a pair of brushes, and
the motor is short-circuited by attaching a terminal connected to an external power source to each of the pair of brushes and connecting the terminals to each other.

2. The vehicle seat belt apparatus according to claim 1, wherein
a reduction ratio of the reducing mechanism is set so as a rotational speed of the shaft to be not higher than a maximum allowable rotational speed of the motor when the seat belt is pulled out.

3. The vehicle seat belt apparatus according to claim 1, wherein
the rotational resistance member is a torsion bar disposed coaxial with the spool, the torsion bar generating the rotational resistance force by twisting.

4. The vehicle seat belt apparatus according to claim 1, wherein
the reducing mechanism includes a spool gear fixed to the spool, and a motor gear meshing with the spool gear and fixed to the shaft, and
the motor gear has an outer diameter larger than an outer diameter of the spool gear.

* * * * *